United States Patent
Soga et al.

(10) Patent No.: US 11,811,255 B2
(45) Date of Patent: Nov. 7, 2023

(54) CHARGING METHOD OF NON-AQUEOUS ELECTROLYTE SECONDARY BATTERY, AND CHARGING SYSTEM OF NON-AQUEOUS ELECTROLYTE SECONDARY BATTERY

(71) Applicant: Panasonic Intellectual Property Management Co., Ltd., Osaka (JP)

(72) Inventors: Masahiro Soga, Osaka (JP); Taisuke Yamamoto, Nara (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 692 days.

(21) Appl. No.: 16/975,615

(22) PCT Filed: Jan. 22, 2019

(86) PCT No.: PCT/JP2019/001806
§ 371 (c)(1),
(2) Date: Aug. 25, 2020

(87) PCT Pub. No.: WO2019/167475
PCT Pub. Date: Sep. 6, 2019

(65) Prior Publication Data
US 2020/0403432 A1 Dec. 24, 2020

(30) Foreign Application Priority Data
Feb. 28, 2018 (JP) .................................. 2018-035271

(51) Int. Cl.
*H02J 7/00* (2006.01)
*H01M 4/36* (2006.01)
(Continued)

(52) U.S. Cl.
CPC ......... *H02J 7/00712* (2020.01); *H01M 4/364* (2013.01); *H01M 4/483* (2013.01);
(Continued)

(58) Field of Classification Search
CPC ............... H02J 7/00712; H02J 7/0048; H01M 10/0525; H01M 10/44; H01M 10/48;
(Continued)

(56) References Cited

U.S. PATENT DOCUMENTS

| 6,377,030 B1 | 4/2002 | Asao et al. |
| 2007/0108945 A1* | 5/2007 | Ohashi ...................... H02J 7/04 320/130 |
| 2016/0254687 A1* | 9/2016 | Tanaka ................ H01M 10/425 320/112 |

FOREIGN PATENT DOCUMENTS

| JP | 2000-106219 A | 4/2000 |
| JP | 2007-143279 A | 6/2007 |

(Continued)

OTHER PUBLICATIONS

International Search Report dated Feb. 26, 2019, issued in counterpart application No. PCT/JP2019/001806, with English translation. (6 pages).

*Primary Examiner* — Nathaniel R Pelton
(74) *Attorney, Agent, or Firm* — WHDA, LLP

(57) ABSTRACT

A charging method of a non-aqueous electrolyte secondary battery involves a first charging step in which, defining x as the ratio of the capacity of a silicon compound to the rated capacity Q(0.1≤x≤0.5), a battery capacity $Q_{1st}$ that satisfies the expression below is charged at a first fixed current value; and a high current charging step in which, after completion of the first charging step, charging is performed at a fixed current value higher than the first fixed current value.

Expression: $0.38x+0.063-\alpha \leq Q_{1st}/Q \leq 0.38x+0.063+\alpha$

3 Claims, 4 Drawing Sheets

(51) Int. Cl.
  *H01M 4/48*       (2010.01)
  *H01M 4/587*      (2010.01)
  *H01M 10/0525*    (2010.01)
  *H01M 10/44*      (2006.01)
  *H01M 10/48*      (2006.01)
  *H01M 4/02*       (2006.01)

(52) U.S. Cl.
  CPC ....... *H01M 4/587* (2013.01); *H01M 10/0525* (2013.01); *H01M 10/44* (2013.01); *H01M 10/48* (2013.01); *H02J 7/0048* (2020.01); *H01M 2004/027* (2013.01)

(58) Field of Classification Search
  CPC ...... H01M 4/483; H01M 4/587; H01M 4/364; H01M 2004/027
  USPC ........................................................ 320/162
  See application file for complete search history.

(56) References Cited

FOREIGN PATENT DOCUMENTS

| | | |
|---|---|---|
| JP | 2010-212228 A | 9/2010 |
| WO | 2015/080285 A1 | 6/2015 |
| WO | 2016/120917 A1 | 8/2016 |
| WO | 2017/056932 A1 | 4/2017 |

* cited by examiner

CHARGING METHOD OF NON-AQUEOUS ELECTROLYTE SECONDARY BATTERY, AND CHARGING SYSTEM OF NON-AQUEOUS ELECTROLYTE SECONDARY BATTERY

TECHNICAL FIELD

The present disclosure relates to a charging method of a non-aqueous electrolyte secondary battery, and a charging system of a non-aqueous electrolyte secondary battery.

BACKGROUND ART

It is known that a silicon compound such as silicon oxide represented by $SiO_x$ can occlude more lithium ions per unit volume than a carbon material such as graphite. For example, Patent Literature 1 discloses a non-aqueous electrolyte secondary battery using graphite and a silicon compound as a negative electrode active material. Further, Patent Literature 2 discloses a charging method of a secondary battery aiming at reduction in initial irreversible capacity of a charge and discharge cycle.

CITATION LIST

Patent Literature

PATENT LITERATURE 1: Japanese Unexamined Patent Application Publication No. 2010-212228
PATENT LITERATURE 2: Japanese Unexamined Patent Application Publication No. 2000-106219

SUMMARY

When a charging current is increased in a non-aqueous electrolyte secondary battery comprising a negative electrode including a silicon compound, for example, cracking of the silicon compound occurs to advance deterioration, and it becomes difficult to ensure favorable cycle characteristics. On the other hand, when the charging current is reduced to be low, a long charging time is required. It is an object of the present disclosure to provide a charging method that enables highly efficient charge while ensuring favorable cycle characteristics, in a non-aqueous electrolyte secondary battery comprising a negative electrode including a carbon material and a silicon compound.

A charging method of a non-aqueous electrolyte secondary battery that is one aspect of the present disclosure is a charging method of a non-aqueous electrolyte secondary battery comprising a negative electrode including a carbon material and a silicon compound as a negative electrode active material, and includes a first charging step of charging a battery capacity $Q_{1st}$ satisfying an expression described below at a first constant current value, when a ratio of a capacity of the silicon compound to a rated capacity Q is x ($0.1 \le x \le 0.5$), and a large current charging step of charging at a constant current value larger than the first constant current value, after an end of the first charging step.

$$0.38x+0.063-\alpha \le Q_{1st}/Q \le 0.38x+0.163+\alpha \quad \text{Expression:}$$

($\alpha=0.1$)

A charging system of a non-aqueous electrolyte secondary battery that is one aspect of the present disclosure is a charging system charging a non-aqueous electrolyte secondary battery comprising a negative electrode including a carbon material and a silicon compound as a negative electrode active material, and comprises a charge control device that executes the charging method.

According to one aspect of the present disclosure, there may be provided the charging method that enables charge with high efficiency while ensuring favorable cycle characteristics, in the non-aqueous electrolyte secondary battery comprising the negative electrode including a carbon material and a silicon compound. Specifically, with the charging method according to the present disclosure, reduction in cycle characteristics may be suppressed while charging in a short time is enabled.

DESCRIPTION OF EMBODIMENTS

It is an important problem to provide a charging method that can highly efficiently charge in a short time period and suppress deterioration of cycle characteristics, in a non-aqueous electrolyte secondary battery comprising a negative electrode including a carbon material and a silicon compound. The present inventors succeeded in suppressing deterioration of the cycle characteristics highly efficiently by clarifying the region where a capacity change derived from the silicon compound during battery charging is large, that is, the region where lithium ions are more easily occluded by the silicon compound than the carbon material, and applying relaxed charging conditions based on the above described expression to only that region.

Hereinafter, one example of the embodiment of the present disclosure will be described in detail. In the following, a cylindrical battery in which a wound-type electrode assembly 14 is housed in a battery case 15 in a cylindrical shape is illustrated, but the battery case is not limited to the cylindrical shape, but may be in a polygonal shape, for example, or may be a battery case formed of a laminated sheet including a metal layer and a resin layer. Further, the electrode assembly may be of a layered type in which a plurality of positive electrodes and a plurality of negative electrodes are alternately layered via separators, the non-aqueous electrolyte secondary battery to which the charging method according to the present disclosure is applicable can be a battery comprising a negative electrode including a carbon material and a silicon compound as a negative electrode active material.

Figure 1:
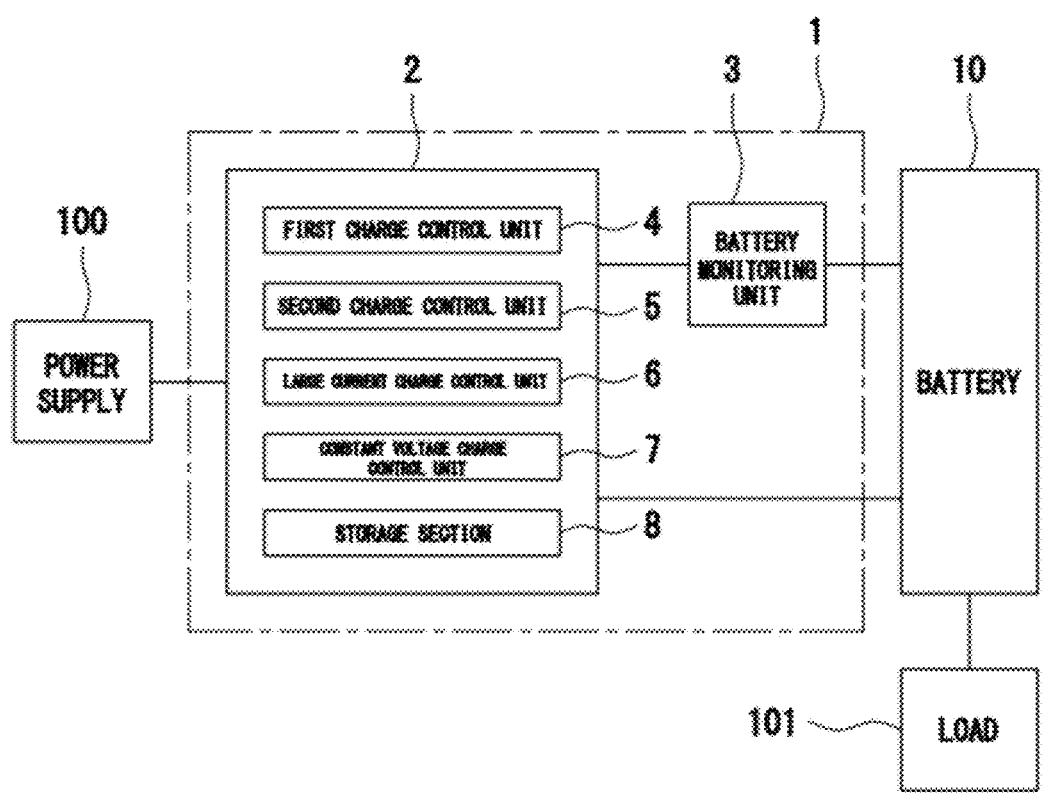
FIG. 1 is a block diagram illustrating a configuration of a charging system of a non-aqueous electrolyte secondary battery, which is one example of an embodiment.

FIG. 1 is a block diagram illustrating a configuration of a charging system 1 of a non-aqueous electrolyte secondary battery which is one example of the embodiment. As illustrated in FIG. 1, the charging system 1 comprises a charge control device 2 controlling charge of a non-aqueous electrolyte secondary battery 10, and a battery monitoring unit 3 monitoring a state of charge of the battery. The non-aqueous electrolyte secondary battery 10 is connected to a load 101, and supplies stored power to the load 101. The charging system 1 may comprise an assembled battery (also called a battery pack, or a battery module) in which a plurality of non-aqueous electrolyte secondary batteries 10 are connected in series, in parallel, or in series and parallel.

The charging system 1 can be widely applied to a charging device, or charging equipment of a non-aqueous electrolyte secondary battery including a carbon material and a silicon compound as a negative electrode active material, and can be applied to, for example, vehicles such as an electric car, and a hybrid car, and various kinds of devices and equipment such as vehicle charging equipment, power storage equipment, and an electric tool charger. The charge control device 2 may be incorporated in a battery module, or may be configured as a part of a device of a vehicle or the like loaded with the charging system 1, or a control device of equipment.

The charge control device 2 is a device that executes a charging method described later. The charge control device 2 determines charging conditions of a battery based on a state of charge of the battery that is acquired from the battery monitoring unit 3 during battery charging. Although details will be described later, the charge control device 2 has first charge control unit 4 that execute a first charging step, second charge control unit 5 that execute a second charging step, large current charge control unit 6 that execute a large current charging step, and constant voltage charge control unit 7 that execute a constant voltage charging step. The charge control device 2 has a rectifier circuit, for example, and converts AC power of a power supply 100 into a predetermined DC power to supply the DC power to the non-aqueous electrolyte secondary battery 10.

The charge control device 2 is configured by an integrated circuit such as an IC chip, and an LSI chip, for example, and has a CPU that is an arithmetic processing unit, and a storage section 8. The CPU has a function of reading and executing a program or the like that is stored in the storage section 8 in advance. The storage section 8 has a function of temporarily storing read programs, processed data and the like, and a function of storing control programs, thresholds and the like. The functions of the above described respective charge control unit are realized by executing the control programs stored in the storage section 8, for example.

Further, the charge control device 2 has a constant current circuit that controls a charging current so that DC power of a predetermined current value is supplied to the battery, a constant voltage circuit that controls a charging voltage so that DC power of a predetermined voltage value is supplied to the battery and the like. Note that the charging circuits such as the rectifier circuit, the constant current circuit, and the constant voltage circuit may be configured as a separate device from the charge control device 2. The charge control device 2 controls the charging circuits based on the state of charge of the battery acquired from the battery monitoring unit 3, and executes charge of the non-aqueous electrolyte secondary battery 10.

The battery monitoring unit 3 detects, for example, the charging current supplied to the non-aqueous electrolyte secondary battery 10, and a battery voltage. The charge control device 2 estimates a state of charge (SOC) from the battery voltage acquired by the battery monitoring unit 3, and executes charge control based on the SOC. Note that the SOC can also be estimated from a charge/discharge current and a charge/discharge time. A conventionally known technique can be applied to an estimation method of the SOC. The charge control device 2 preferably performs constant current charging (CC charging) including a plurality of steps until the battery voltage reaches a predetermined voltage, and thereafter performs constant voltage charging (CV charging).

[Non-Aqueous Electrolyte Secondary Battery]

Figure 2:
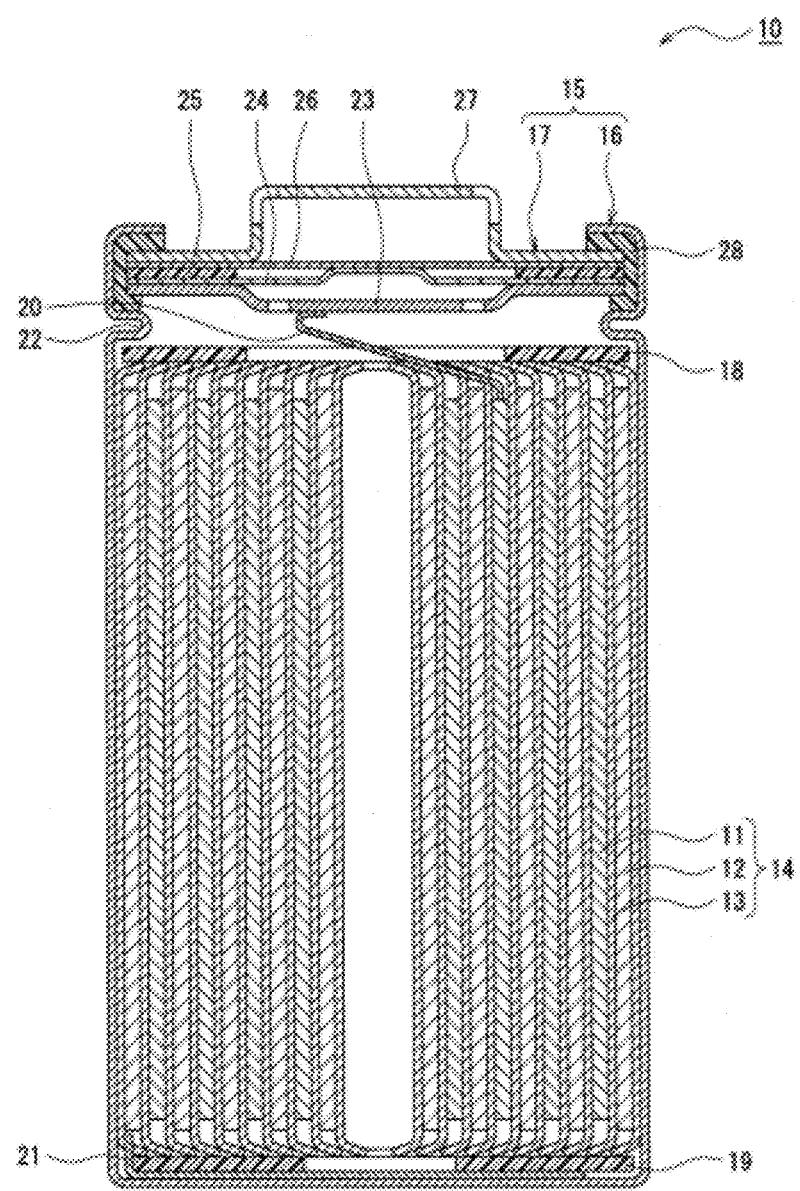
FIG. 2 is a sectional view of a non-aqueous electrolyte secondary battery, which is one example of the embodiment.

FIG. 2 is a sectional view of the non-aqueous electrolyte secondary battery 10 which is one example of the embodiment. As illustrated in FIG. 2, the non-aqueous electrolyte secondary battery 10 includes an electrode assembly 14, a non-aqueous electrolyte (not illustrated) and the battery case 15 that houses the electrode assembly 14 and the non-aqueous electrolyte. The electrode assembly 14 has a wound structure formed by a positive electrode 11 and a negative electrode 12 being wound via a separator 13. The battery case 15 is composed of a bottomed cylindrical exterior can 16, and a sealing assembly 17 blocking an opening of the exterior can 16. Further, the non-aqueous electrolyte secondary battery 10 includes a resin gasket 28 disposed between the exterior can 16 and the sealing assembly 17.

The non-aqueous electrolyte includes a non-aqueous solvent, and an electrolyte salt dissolved in the non-aqueous solvent. As the non-aqueous solvent, esters, ethers, nitriles, amides, and mixed solvents of two kinds or more of these and the like may be used. The non-aqueous solvents may include a halogen-substituted compound obtained by replacing at least some of hydrogen in these solvents with halogen atoms such as fluorine. Note that the non-aqueous electrolyte is not limited to a liquid electrolyte, and may be a solid electrolyte using a gel polymer or the like. As the electrolyte salt, for example, a lithium salt such as $LiPF_6$ is used.

The electrode assembly 14 is composed of the positive electrode 11 in a long shape, the negative electrode 12 in a long shape, two separators 13 in a long shape, a positive electrode tab 20 joined to the positive electrode 11, and a negative electrode tab 21 joined to the negative electrode 12. The negative electrode 12 is formed to have a size slightly larger than that of the positive electrode 11 to prevent precipitation of lithium. Specifically, the negative electrode 12 is formed to be longer in a longitudinal direction and a width direction (lateral direction) than the positive electrode 11. The two separators 13 are each formed to have a size slightly larger than at least the positive electrode 11, and are disposed to sandwich the positive electrode 11, for example.

Insulating plates 18 and 19 are respectively disposed above and under the electrode assembly 14. In the example illustrated in FIG. 2, the positive electrode tab 20 attached to the positive electrode 11 extends to a sealing assembly 17 side through a through-hole of the insulating plate 18, and the negative electrode tab 21 attached to the negative electrode 12 extends to a bottom side of the exterior can 16 through an outside of the insulating plate 19. The positive electrode tab 20 is connected to an undersurface of a filter 23 that is a bottom plate of the sealing assembly 17 by welding or the like, and a cap 27 that is a top plate of the sealing assembly 17 electrically connected to the filter 23 is a positive electrode terminal. The negative electrode tab 21 is connected to an inner surface of a bottom of the exterior can 16 by welding or the like, and the exterior can 16 is a negative electrode terminal.

The exterior can 16 is, for example, a metal container in a bottomed cylindrical shape. As described above, the gasket 28 is provided between the exterior can 16 and the sealing assembly 17, and thereby an inner space of the battery case 15 is hermetically closed. The exterior can 16 has a recessed portion 22 formed by, for example, a side face portion being pressed from outside, and supporting the sealing assembly 17. The recessed portion 22 is preferably formed annularly along a peripheral direction of the exterior can 16, and supports the sealing assembly 17 on a top surface thereof. Further, an upper end portion of the exterior can 16 is bent inward and is crimped to a peripheral edge of the sealing assembly 17.

The sealing assembly 17 has a structure in which the filter 23, a lower vent member 24, an insulating member 25, an upper vent member 26, and the cap 27 are layered from a side of the electrode assembly 14. The members constituting the sealing assembly 17 each have, for example, a disk shape or a ring shape, and the members except for the insulating member 25 are each electrically connected to one another. The lower vent member 24 and the upper vent member 26 are connected to each other at each center part, and the insulating member 25 is interposed between the peripheral edges of the vent members. When internal pressure of the battery increases by abnormal heat generation, the lower vent member 24 deforms and breaks so as to push up the upper vent member 26 toward the side of the cap 27, and thereby a current path between the lower vent member 24 and the upper vent member 26 is disconnected. When the internal pressure further increases, the upper vent member 26 breaks, and gas is emitted from the opening of the cap 27.

[Positive Electrode]

The positive electrode 11 has a positive electrode current collector and a positive electrode mixture layer formed on both surfaces of the positive electrode current collector. As the positive electrode current collector, it is possible to use foil of a metal stable in a potential range of the positive electrode 11, such as aluminum, a film including such a metal disposed on the surface layer thereof, or the like. The positive electrode mixture layer includes a positive electrode active material, a conductive agent, and a binder. The positive electrode 11 can be produced, for example, by applying a positive electrode mixture slurry including the positive electrode active material, the conductive agent, the binder and the like on the positive electrode current collector, drying the applied slurry and thereafter compressing the applied slurry to form the positive electrode mixture layer on both the surfaces of the positive electrode current collector.

The positive electrode active material is composed of a lithium metal composite oxide as a main component. Examples of a metal element included in the lithium metal composite oxide include Ni, Co, Mn, Al, B, Mg, Ti, V, Cr, Fe, Cu, Zn, Ga, Sr, Zr, Nb, Sn, Ta, W and the like. An example of a preferable lithium metal composite oxide is a composite oxide including at least one of the group consisting of Ni, Co, Mn and Al. Note that inorganic compound particles such as aluminum oxide and lanthanoid-containing compound may be adhered to the surfaces of the lithium metal composite oxide particles.

Examples of the conductive agent included in the positive electrode mixture layer include carbon materials such as carbon black, acetylene black, Ketjen black, and graphite. Examples of the binder included in the positive electrode mixture layer include a fluorine resin such as polytetrafluoroethylene (PTFE), and polyvinylidene fluoride (PVdF), polyacrylonitrile (PAN), polyimide resin, acrylic resin, and polyolefin resin. These resins, and carboxymethyl cellulose (CMC) or a cellulose derivative such as a salt thereof, polyethylene oxide (PEO) or the like may be combined.

[Negative Electrode]

The negative electrode 12 has a negative electrode current collector and a negative electrode mixture layer formed on both surfaces of the negative electrode current collector. As the negative electrode current collector, it is possible to use foil of a metal stable in a potential range of the negative electrode 12, such as copper, a film including such a metal disposed on the surface layer thereof, or the like. The negative electrode mixture layer includes a negative electrode active material, and a binder. The negative electrode 12 can be produced, for example, by applying a negative electrode mixture slurry including the negative electrode active material, the binder and the like on the negative electrode current collector, drying the applied slurry, and thereafter compressing the applied slurry to form the negative electrode mixture layer on both the surfaces of the negative electrode current collector.

The negative electrode mixture layer includes a carbon material and a silicon compound that reversibly occlude and release lithium ions, as the negative electrode active material. Preferable carbon materials include graphite such as natural graphite such as scaly graphite, massive graphite and earth graphite, and artificial graphite such as massive artificial graphite (MAG), and graphitized mesophase carbon microbeads (MCMB). A content of the silicon compound in the negative electrode mixture layer is, for example, 1 to 15% by mass, and preferably 5 to 10% by mass, to a total mass of the negative electrode active material. A mixing ratio of the silicon compound and graphite is, by mass ratio, for example, 1:99 to 15:85, and is preferably 5:95 to 10:90.

Note that as the negative electrode active material, a metal that alloys with lithium other than Si, an alloy including the metal, a compound including the metal and the like may be used. When a material having low conductivity such as a lithium titanate is used as the negative electrode active material, a conductive agent such as carbon black may be added to the negative electrode mixture layer.

An example of the silicon compound includes silicon oxide represented by $SiO_x$. The silicon oxide represented by $SiO_x$ has a structure in which Si fine particles are dispersed in an amorphous $SiO_2$ matrix, for example. One example of a preferable silicon oxide is $SiO_x$ ($0.5 \leq x \leq 1.6$). The silicon compound may be composite particles in which Si fine particles are dispersed in a lithium silicate ($Li_{2y}SiO_{(2+y)}$ ($0<y<2$)) phase.

A conductive coating composed of a material with higher conductivity than that of silicon oxide is preferably formed on the particle surfaces of the silicon oxide represented by $SiO_x$. Examples of the material composing the conductive coating include at least one of the group consisting of carbon materials, metals and metal compounds. Among them, a carbon material such as amorphous carbon is preferable. A carbon coating can be formed by, for example, a CVD method using acetylene, methane or the like, a method that mixes coal pitch, petroleum pitch, a phenol resin or the like with $SiO_x$ particles, and performs thermal treatment, and the like. Further, the conductive coating may be formed by adhering a conductive filler such as carbon black to the particle surfaces of $SiO_x$ by using a binder. The conductive coating is formed by 0.5 to 10% by mass with respect to the mass of the $SiO_x$ particles, for example.

For the binder included in the negative electrode mixture layer, a fluorine resin, PAN, polyimide resin, acrylic resin, polyolefin resin and the like can be used similarly to the case of the positive electrode 11. When the mixture slurry is prepared by using an aqueous solvent, CMC or salt thereof, dispersion of styrene-butadiene rubber (SBR), polyacrylic acid (PAA) or salt thereof, polyvinyl alcohol or the like is preferably used.

[Separator]

As the separator 13, a porous sheet having ion permeability and insulation is used. Specific examples of the porous sheet include microporous thin films, woven fabric, and non-woven fabric. As materials for the separator 13, olefin resins such as polyethylene and polypropylene, cellulose and the like are suitable. The separator 13 may be of either a single-layer structure or a multi-layer structure. A heat resistant layer or the like may be formed on a surface of the separator 13.

Figure 3:
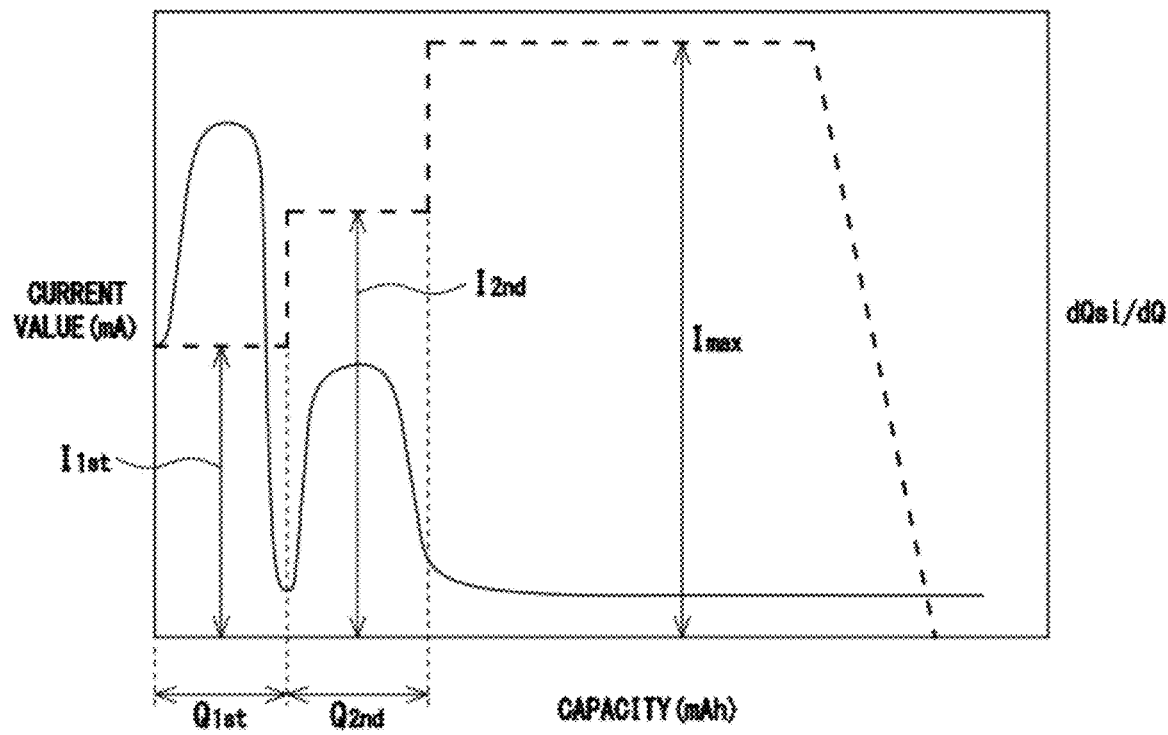
FIG. 3 is a view for explaining a charging method of a non-aqueous electrolyte secondary battery, which is one example of the embodiment.

Hereinafter, a charging method of the non-aqueous electrolyte secondary battery 10 will be described in detail with proper reference to FIG. 3. FIG. 3 is a graph showing a relationship among a battery capacity, a charging current and $dQ_{Si}/dQ$. Here, Q means a rated capacity of the battery, and $Q_{Si}$ means a capacity derived from a silicon compound. The rated capacity Q is, for example, 3000 mAh to 6000 mAh. In general, in the non-aqueous electrolyte secondary battery 10, the negative electrode 12 is a capacity regulation electrode, and therefore the negative electrode capacity is the battery capacity. The present charging method is particularly suitable when $I_{max}$ described later is 0.5 C or more, or 0.7 C or more.

The non-aqueous electrolyte secondary battery 10 is charged by going through a constant current charging step with at least two steps having a first charging step of charging a battery capacity $Q_{1st}$ satisfying the following expression 1 with a first constant current value $I_{1st}$, and a large current charging step of charging at a constant current value $I_{max}$ larger than the first constant current value $I_{1st}$ after an end of the first charging step, when a ratio of a capacity of the silicon compound to the rated capacity Q is x (0.1≤x≤0.5).

$$0.38x+0.063-\alpha1 \leq Q_{1st}/Q \leq 0.38x+0.063+\alpha1 \quad \text{Expression 1:}$$

Here, α1 is preferably 0.1, and more preferably 0.05.

As illustrated in FIG. 3, in a charging region of the battery capacity $Q_{1st}$, a change amount ($dQ_{Si}/dQ$) of the capacity $Q_{Si}$ derived from the silicon compound is large, and lithium ions are more easily occluded by the silicon compound than graphite. By executing constant current charging with the current value reduced to be low in this region, cracking of the silicon compound can be suppressed, and favorable cycle characteristics can be maintained. Expression 1 is an empirical expression obtained from an experiment on the value of $dQ_{Si}/dQ$ of OCV obtained when the Si capacity ratio is changed. The capacity ratio x of the silicon compound to the rated capacity Q (negative electrode capacity) is obtained by detecting dV/dQ representing a voltage change amount dV to a capacity change amount dQ in a predetermined time.

In charging the non-aqueous electrolyte secondary battery 10, a second charging step of charging at a second constant current value $I_{2nd}$ that is larger than the first constant current value $I_{1st}$ and smaller than the current value $I_{max}$ of the large current charging step is preferably further provided between the first charging step and the large current charging step. Specifically, when the battery capacity reaches $Q_{1st}$, and the first charging step is ended, the second charging step is executed. In the second charging step, a battery capacity $Q_{2nd}$ satisfying the following expression 2 is charged with the second constant current value $I_{2nd}$. Expression 2 is an empirical expression similar to expression 1.

$$0.13x+0.173-\alpha2 \leq Q_{2nd}/Q \leq 0.13x+0.173+\alpha2 \quad \text{Expression 2:}$$

Here, α2 is preferably 0.1, and more preferably 0.05.

As illustrated in FIG. 3, in a charging region of the battery capacity $Q_{2nd}$, a change amount of the capacity $Q_{Si}$ is large, and lithium ions are more easily occluded by the silicon compound than graphite. By executing constant current charging with the current value reduced to be low in the charging region of the battery capacity $Q_{2nd}$, cracking of the silicon compound can be suppressed, and favorable cycle characteristics can be maintained. On the other hand, the change amount of the capacity $Q_{Si}$ is smaller in the charging region of the battery capacity $Q_{2nd}$ as compared with the charging region of the charge capacity $Q_{1st}$ and therefore, charging efficiency is preferably enhanced by establishing $I_{1st}<I_{2nd}$. As illustrated in FIG. 3, there exist two peaks of $dQ_{Si}/dQ$, at the beginning of charging of the non-aqueous electrolyte secondary battery 10. A range of the battery capacity $Q_{1st}$ corresponds to a first peak width, and a range of the battery capacity $Q_{2nd}$ corresponds to a second peak width.

In the first charging step, charging at the first constant current value $I_{1st}$ satisfying the following expression 3 is preferable. Expression 3 is an empirical expression similar to expressions 1 and 2.

$$82/(81.8x+64) \times (0.3/0.7)-\alpha3 < I_{1st}/I_{max} \leq 82/(81.8x+64) \times (0.3/0.7)+\alpha3 \quad \text{Expression 3:}$$

Here, α3 is preferably 0.3, and more preferably 0.2.

At the beginning of charging in which the change amount of the capacity $Q_{Si}$ is large, and lithium ions are more easily occluded by the silicon compound than graphite, constant current charging with the current value reduced to be $I_{1st}$ is executed, whereby cracking of the silicon compound can be suppressed, and favorable cycle characteristics can be maintained.

Further, in the second charging step, charging at the second constant current value $I_{2nd}$ satisfying the following expression 4 is preferably performed. Expression 4 is an empirical expression similar to expressions 1 to 3.

$$36/(122.4x+10.9) \times (0.5/0.7)-\alpha4 \leq I_{2nd}/I_{max} \leq 36/(122.4x+10.9) \times (0.5/0.7)+\alpha4 \quad \text{Expression:}$$

Here, α4 is preferably 0.3, and more preferably 0.2.

At the beginning of charging in which the change amount of the capacity $Q_{Si}$ is large, and lithium ions are more easily occluded by the silicon compound than graphite, constant current charging with the current value reduced to $I_{2nd}$ is executed, whereby cracking of the silicon compound can be suppressed, and favorable cycle characteristics can be maintained.

In the present charging method, the large current charging step of charging at the constant current value $I_{max}$ is executed when the battery capacity reaches $Q_{1st}$, or when the battery capacity reaches $Q_{2nd}$ in the case of the second charging step being carried out. $I_{max}$ is the largest charging current in the plurality of charging steps. In the charging region where the change amount of the capacity $Q_{Si}$ is small, reduction in charting time can be achieved by increasing the current amount and charging at $I_{max}$. The large current charging step is ended when the battery voltage reaches a predetermined threshold (for example, 4.2 V). Thereafter, CV charging (constant voltage charging step) is executed until the current reaches a predetermined threshold with a predetermined battery voltage (for example, 4.2 V).

Figure 4:
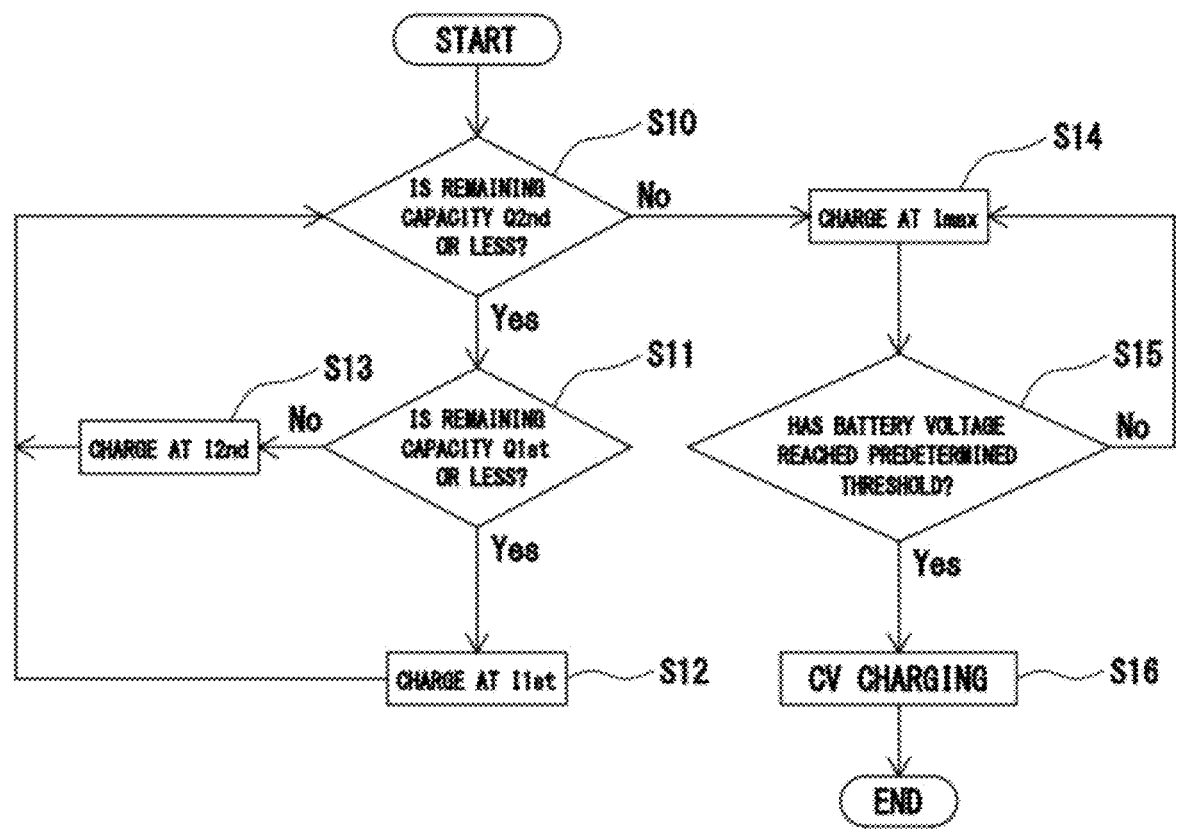
FIG. 4 is a flowchart illustrating one example of a charge control procedure of the non-aqueous electrolyte secondary battery.

FIG. 4 is a flowchart illustrating one example of a control procedure in the above described charging method. Here, a specific example of charge control will be described by citing an example of a case where a remaining capacity of the non-aqueous electrolyte secondary battery 10 is smaller than a start level of CV charging.

As illustrated in FIG. 4, when charge of the battery is performed, a remaining capacity of the battery is confirmed first (S10, S11). For example, the charge control device 2 estimates SOC (remaining capacity) of the battery from detection information on the battery voltage and the like acquired by the battery monitoring unit 3. When the remaining capacity of the battery is the above described $Q_{1st}$ or less, the first charging step of charging at the first constant current value $I_{1st}$ is executed until the battery capacity reaches $Q_{1st}$ (S12). The first charging step is executed by the function of the first charge control unit 4.

On the other hand, when the remaining capacity of the battery is the above described $Q_{1st}$ or more and $Q_{2nd}$ or less, the second charging step of charging at the second constant current value $I_{2nd}$ is executed until the battery capacity reaches $Q_{2nd}$ (S13). The second charging step is executed by the function of the second charge control unit 5. Subsequently, under the condition that the remaining capacity of the battery reaches $Q_{2nd}$, the large current charging step of charging at the constant current value $I_{max}$ is executed until the battery voltage reaches the predetermined threshold (S14, S15). The large current charging step is executed by the function of the large current charge control unit 6. Specifically, in the present embodiment, CC charging with the three steps is executed until the battery voltage reaches the predetermined threshold.

When the battery voltage reaches the predetermined threshold, the constant voltage charging step of performing CV charging is executed until the current reaches a predetermined threshold (S16). The constant voltage charging step is executed by the function of the constant voltage charge control unit 7.

EXAMPLES

Hereinbelow, the present disclosure will be further described with reference to examples, but the present disclosure is not intended to be limited to these examples.

Example 1

[Production of Positive Electrode]

As the positive electrode active material, a composite oxide represented by $LiNi_{0.82}Co_{0.15}Al_{0.03}O_2$ was used. 100 parts by mass of the positive electrode active material, 1 part by mass of acetylene black, and 0.9 parts by mass of polyvinylidene fluoride were mixed, an appropriate amount of N-methyl-2-pyrrolidone was added thereto to prepare a positive electrode mixture slurry. Subsequently, the positive electrode mixture slurry was applied on both surfaces of a positive electrode current collector in a long shape composed of aluminum foil, and the applied slurry was dried. After the dried applied slurry was compressed, the compressed applied slurry was cut into a predetermined electrode size to produce the positive electrode with the positive electrode mixture layer formed on both the surfaces of the positive electrode current collector. An exposed portion in which the mixture layer does not exist and the current collector surface is exposed was provided in a central portion in the longitudinal direction of the positive electrode, and a positive electrode tab of aluminum was welded to the exposed portion.

[Production of Negative Electrode]

As the negative electrode active material, 94 parts by mass of graphite powder, and 6 parts by mass of silicon oxide represented by SiO ($SiO_x$, x=1) with carbon coating formed on particle surfaces were used. 100 parts by mass of the negative electrode active material, 1.5 parts by mass of carboxymethyl cellulose sodium, and 1 part by mass of styrene-butadiene rubber dispersion were mixed, an appropriate amount of water was added thereto to prepare a negative electrode mixture slurry. Subsequently, the negative electrode mixture slurry was applied on both surfaces of a negative electrode current collector in a long shape composed of copper foil, and the applied slurry was dried. After the dried applied slurry was compressed, the compressed applied slurry was cut into a predetermined electrode size to produce the negative electrode with the negative electrode mixture layer formed on both the surfaces of the negative electrode current collector. An exposed portion in which the mixture layer does not exist and the current collector surface is exposed was provided at one end portion (an end portion located at a winding end side of the electrode assembly) in a longitudinal direction of the negative electrode, and a nickel negative electrode tab was welded to the exposed portion.

[Preparation of Non-Aqueous Electrolyte]

To a mixed solvent prepared by mixing ethylene carbonate (EC) and dimethyl carbonate (DMC) at a volume ratio of 25:75 (1 bar, 25° C.), $LiPF_6$ was dissolved at a concentration of 1 mol/L to prepare the non-aqueous electrolyte.

[Production of Non-Aqueous Electrolyte Secondary Battery]

After the above described positive electrode and the above described negative electrode were wound on a core via a separator formed of a polyethylene microporous film, the core was removed to produce a wound-type electrode assembly. Subsequently, the electrode assembly was inserted into a cylindrical iron exterior can, and the negative electrode tab was resistance-welded to the bottom inner surface of the exterior can. After the above described non-aqueous electrolyte was poured into the exterior can, the positive electrode tab was welded to the sealing assembly, and the opening of the exterior can was sealed with the sealing assembly to produce a cylindrical non-aqueous electrolyte secondary battery with a diameter of 18 mm, a height of 65 mm, and the rated capacity Q of 3350 mAh. The capacity ratio x of $SiO_x$ to the rated capacity Q was 0.21.

[Initial Charge/Discharge of Battery]

Under a room temperature environment, the above described battery was charged with CC until the battery voltage becomes 4.2 V under charging conditions shown in Table 1, and thereafter, the battery was charged with CV until the current becomes 168 mA with a constant voltage of 4.2 V. In Example 1, the first charging step satisfying the conditions of the above described expressions 1 and 3, and the large current charging step were executed. After charging, the battery was discharged with the constant current of 0.5 C until the battery voltage became 2.5 V. The charge/discharge cycle was repeated for 100 cycles, and a value obtained by dividing a battery capacity at the $100^{th}$ cycle by the battery capacity of the initial time was obtained as a capacity maintenance rate.

Examples 2 to 4

In the same manner as in Example 1 except that the charging conditions were changed to the conditions shown in Table 1, CC-CV charging was performed. In Examples 2 to 4, the first charging step satisfying the conditions of the above described expressions 1 and 3, the second charging step satisfying the conditions of the above described expressions 2 and 4, and the large current charging step were executed.

Comparative Examples 1 and 2

In the same manner as in Example 1 except that CC charging of one step was performed under the charging conditions shown in Table 1, CC-CV charging was performed.

TABLE 1

| | x | $Q_{1st}$ | $I_{1st}$ | $Q_{2nd}$ | $I_{2nd}$ | $I_{max}$ | Capacity maintenance rate | Charging time |
|---|---|---|---|---|---|---|---|---|
| Example 1 | 0.21 | 500 mAh | 0.3 C. | — | — | 0.7 C. | 90.9% | 175 min |
| Example 2 | 0.21 | 500 mAh | 0.3 C. | 700 mAh | 0.5 C. | 0.7 C. | 91.3% | 181 min |
| Example 3 | 0.16 | 650 mAh | 0.32 C. | 970 mAh | 0.6 C. | 0.7 C. | | |
| Example 4 | 0.31 | 650 mAh | 0.28 C. | 770 mAh | 0.38 C. | 0.7 C. | | |
| Comparative example 1 | 0.21 | — | | — | — | 0.3 C. | 90.8% | 233 min |
| Comparative example 2 | 0.21 | — | — | — | — | 0.7 C. | 86.7% | 127 min |

As shown in Table 1, according to charging profiles of Examples 1 and 2, the capacity maintenance rates are high as compared with the case of Comparative Example 2, and favorable cycle characteristics can be maintained. Further, in Examples 1 and 2, the capacity maintenance rates similar to the case of Comparative Example 1 in which the charging time is long were able to be realized. Specifically, according to the charging profiles of Examples 1 and 2, charge can be performed with high efficiency while the favorable cycle characteristics are ensured.

REFERENCE SIGNS LIST

1 Charging system
2 Charge control device
3 Battery monitoring unit
4 First charge control unit
5 Second charge control unit
6 Large current charge control unit
7 Constant voltage charge control unit
8 Storage section
10 Non-aqueous electrolyte secondary battery
11 Positive electrode
12 Negative electrode
13 Separator
14 Electrode assembly
15 Battery case
16 Exterior can
17 Sealing assembly
18, 19 Insulating plate
20 Positive electrode tab
21 Negative electrode tab
22 Recessed portion
23 Filter
24 Lower vent member
25 Insulating member
26 Upper vent member
27 Cap
28 Gasket
100 Power supply
101 Load

The invention claimed is:

1. A charging method of a non-aqueous electrolyte secondary battery comprising a negative electrode including a carbon material and a silicon compound as a negative electrode active material, comprising:
    a first charging step of charging a battery capacity $Q_{1st}$ satisfying an expression described below at a first constant current value, when a ratio of a capacity of the silicon compound to a rated capacity Q is x (0.1≤x≤0.5); and
    a large current charging step of charging at a constant current value larger than the first constant current value, after an end of the first charging step, the expression being: $0.38x+0.063-\alpha \leq Q_{1st}/Q \leq 0.38x+0.063+\alpha$ wherein α=0.1.

2. The charging method of a non-aqueous electrolyte secondary battery according to claim 1, further comprising:
    a second charging step of charging at a second constant current value larger than the first constant current value, and smaller than a current value of the large current charging step, between the first charging step and the large current charging step,
    wherein in the second charging step, a battery capacity $Q_{2nd}$ satisfying an expression described below is charged at the second constant current value, the expression being: $0.13x+0.173-\alpha \leq Q_{2nd}/Q \leq 0.13x+0.173+\alpha$.

3. A charging system charging a non-aqueous electrolyte secondary battery comprising a negative electrode including a carbon material and a silicon compound as a negative electrode active material, the charging system comprising:
    a charge control device that executes the charging method according to claim 1.

* * * * *